April 28, 1931.    L. H. MADER    1,803,196
COLLAR FOR DOGS OR OTHER ANIMALS
Filed Feb. 4, 1929

Inventor
Lewis H. Mader
By Attorneys
Southgate Gays Hawley

Patented Apr. 28, 1931

1,803,196

UNITED STATES PATENT OFFICE

LEWIS H. MADER, OF WORCESTER, MASSACHUSETTS, ASSIGNOR TO GRATON & KNIGHT COMPANY, OF WORCESTER, MASSACHUSETTS, A CORPORATION OF MASSACHUSETTS

COLLAR FOR DOGS OR OTHER ANIMALS

Application filed February 4, 1929. Serial No. 337,332.

This invention relates to improvements in collars worn for identification by dogs or other animals.

On such collars, it is common to provide a plate on which appears the owner's name, address, or other data, and these plates are usually riveted or otherwise permanently fixed to the collars. When a particular collar is discarded, due to the growth or sale of the animal or to any other cause, the cost of the plate and the expense of the engraving or lettering thereon is lost.

It is the object of my invention to provide improved means by which an identification plate may be detachably secured to a collar for a dog or other animal, so that it may be readily removed therefrom, for replacement or for transfer to another collar.

With this general object in view, my invention further relates to arrangements and combinations of parts which will be hereinafter described and more particularly pointed out in the appended claims.

A preferred form of the invention is shown in the drawings in which

Figure 1:
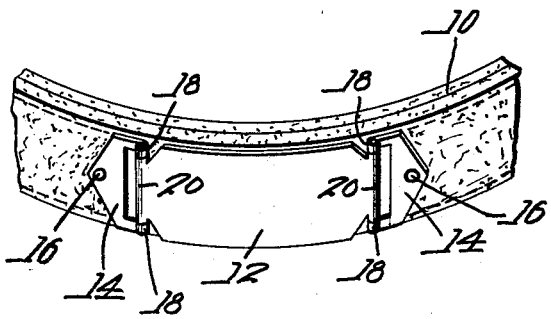
Fig. 1 is a perspective view of a portion of a collar provided with my improvements.

Referring to the drawings, I have shown a band 10, usually of leather but which may be of any other suitable material. I have also shown an identification plate 12 and end members 14.

Figure 2:
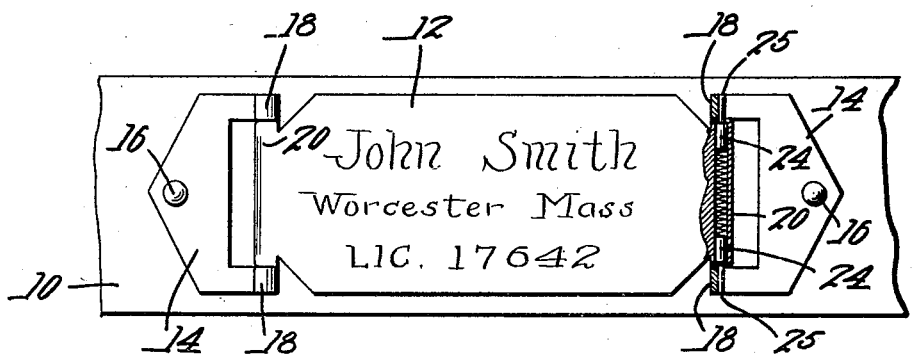
Fig. 2 is a front elevation, partly in section, of my improved construction.

The plate 12 is formed of a firm and substantially rigid material, preferably metal, and is commonly engraved with the owner's name and address and frequently with a license number, as indicated in Fig. 2.

The end members 14 are also preferably of metal and are permanently secured to the band 10 by rivets 16 or in any other convenient manner. Preferably, a single rivet only is used for each member 14, so that the members 14 may be swung angularly about the rivets 16 to bring them into exact alignment with the plate 12.

Each end member 14 is provided with spaced socket portions 18, and the plate 12 is provided with end portions 20 of such width as to fit snugly between the sockets 18. The end portions 20 are recessed to provide cylindrical openings 21, within each of which a spring 22 and a pair of plungers 24 are mounted. The plungers 24 are enlarged at their inner ends, and outward movement of the plungers is limited by engagement of the enlarged ends with the contracted end walls of the openings 21.

The reduced outer end portions 25 of the plungers 24 are received in the sockets 18, as shown in Fig. 2, and thus firmly secure the plate 12 in position and hold it from displacement.

It will be noted that the plunger portions 25 are substantially concealed in the sockets 18, presenting the appearance of a stud or rivet extending continuously through the members 14 and the plate 12.

Figure 3:
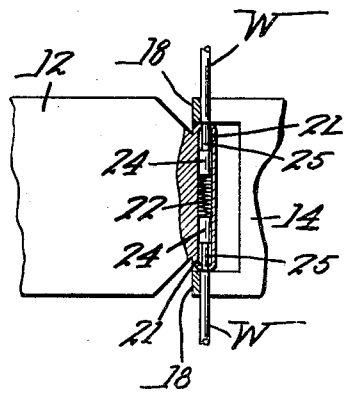
Fig. 3 is a partial front elevation similar to Fig. 2 but showing the parts in a different position.

When it is desired to remove the plate 12, pins or wires W are inserted in the sockets 18, displacing the plungers 24 inward to the position indicated in Fig. 3, in which position the end of the plate 12 can be separated from the corresponding end member 14. The other end of the plate 12 is then similarly separated and the plate is thus quickly and easily removed.

It will be noted, however, that the method of removal, while very simple, is not obvious or easily apparent by an inspection of the assembled parts and consequently there is little chance of unauthorized removal of the plate 12.

With this simple construction, a plate may be readily removed from one collar and mounted on a collar of different size or construction, or a different plate may be substituted for the one removed.

Having thus described my invention and the advantages thereof, I do not wish to be limited to the details herein disclosed, otherwise than as set forth in the claims, but what I claim is:—

1. In an animal collar, a band, an identification plate, a pair of end members fixed to said band beyond the ends of said plate, and detachable connections between the extreme end portions of said plate and said end members, whereby said plate may be readily removed and replaced.

2. An animal collar as set forth in claim 1, in which the end members are pivotally secured to the band and are angularly movable for alignment with said plate.

3. An animal collar as set forth in claim 1, in which said end members are provided with spaced sockets, and in which said plate is provided with portions fitting between said sockets and with outwardly spring pressed plungers received in said sockets and having their end portions substantially concealed thereby.

In testimony whereof I have hereunto affixed my signature.

LEWIS H. MADER.